| United States Patent [19] | [11] 3,945,849 |
| Hoffman | [45] Mar. 23, 1976 |

[54] BATTERY CELL WITH QUATERNARY AMMONIUM HALIDE

[75] Inventor: Arnold Hoffman, Brookline, Mass.

[73] Assignee: Polaroid Corporation, Cambridge, Mass.

[22] Filed: June 26, 1970

[21] Appl. No.: 50,354

[52] U.S. Cl. ............................... 136/107; 136/155
[51] Int. Cl.² ........................................ H01M 6/04
[58] Field of Search ........... 136/154, 155, 107, 164, 136/163, 125, 127, 129; 204/55

[56] References Cited
UNITED STATES PATENTS

| 2,566,114 | 8/1951 | Bloch | 136/155 |
| 2,950,999 | 8/1960 | Craig et al. | 136/155 |
| 3,160,526 | 12/1964 | Ruetschi | 136/154 |
| 3,291,646 | 12/1966 | Gould | 136/154 |
| 3,594,235 | 7/1971 | Moran | 136/154 |
| 3,620,848 | 11/1971 | Epstein et al. | 136/138 |

*Primary Examiner*—Donald L. Walton
*Attorney, Agent, or Firm*—Philip G. Kiely

[57] ABSTRACT

A corrosion inhibitor for battery anodes, e.g., metals such as zinc, lead, and the like, in primary battery cells, comprises a quaternary ammonium salt, particularly, tetraalkyl ammonium chloride.

11 Claims, No Drawings

BATTERY CELL WITH QUATERNARY AMMONIUM HALIDE

BACKGROUND OF THE INVENTION

The durability and efficiency of electrochemical cells, particularly shelf life durability, is limited by, among other factors, corrosion of the metallic anode which causes dissolution of the anode and generation of hydrogen gas. For example, in the Leclanche primary battery cell, the zinc anode undergoes corrosion in the electrolyte resulting in dissolution of the zinc and the attendant impaired efficiency of the cell. Various methods for minimizing anode attack have been attempted, for example, by means of additives to the electrolyte and by treating the anode as by coating with a material to reduce anode attack. However, such materials must be compatible with the electrochemical system and, particularly in the case of materials coated on the anode, and must not so insulate the anode as to prevent its satisfactory functioning.

Mercuric chloride is one of the materials widely employed as a metallic corrosion inhibitor in batteries. However, economic factors militates against its extensive use in battery systems.

A novel corrosion inhibition system has now been found which is not susceptible to the deficiencies of the prior art.

SUMMARY OF THE INVENTION

The present invention is directed to a corrosion inhibitor for zinc, lead, and the like, employed as anodic materials in primary battery cells, comprising a quaternary ammonium salt. The preferred quaternary ammonium salt is tetraalkyl ammonium chloride, more preferably tetraheptyl ammonium chloride. Combinations of quaternary ammonium compounds with corrosion inhibitors such as mercuric chloride are also within the scope of the present invention.

DETAILED DESCRIPTION OF THE INVENTION

The present invention is directed to the corrosion inhibition of metals such as zinc and lead, when employed as anodes in primary battery cells such as the Leclanche cell, by compounds of the formula:

$NR_4X$ wherein R is an aliphatic or aromatic group, preferably an alkyl group, more preferably a 1–10 carbon alkyl group and X is an anion, e.g., hydroxy, bromide, chloride, etc. The particularly preferred compounds are those containing 6–10 carbon atoms in the alkyl groups. Thus, it has been found that the greatest efficiency is achieved employing quaternary ammonium salts of relatively large molecular bulk. However, it is necessary that the compounds retain the ability to be solubilized or dispersed in the system in which it is employed. It should be understood, however, that a limited amount of solubility or dispersibility may be incorporated into the quaternary ammonium salts by the inclusion of substituents on the R group, for example, a carboxyl group.

The preferred compounds within the scope of the present invention comprise the tetraalkyl ammonium chlorides. Such compounds are particularly suitable for use as corrosion inhibitors in Leclanche type cells wherein the electrolyte employed is ammonium chloride. It has been found that the amount of tetraalkyl ammonium chloride necessary for corrosion inhibition decreases with the size of the alkyl group. Thus, equivalent corrosion resistance can be achieved with a less amount of tetraheptyl ammonium chloride than with tetramethyl ammonium chloride.

In order to illustrate the corrosion resistance provided by the compounds of the present invention, strips of zinc weighing 1 gram were immersed in the indicated compounds for a period of 21 days at room temperature. Table 1 indicates the compounds employed and the extent of dissolution of the zinc.

TABLE 1

| Compound (0.01 M) | Zinc in Solution (mgs.) |
|---|---|
| Ammonium chloride (Control) | 0.88 |
| Tetramethyl ammonium chloride | 0.18 |
| Tetraethyl ammonium chloride | 0.06 |
| Tetrapropyl ammonium chloride | 0.06 |
| Tetraheptyl ammonium chloride | 0.01 |

From the foregoing table, it will be noted while the corrosive effects of the ammonium chloride electrolyte are relatively high, the employment of a quaternary ammonium compound significantly reduces the dissolution of the zinc. It will be further noted that dissolution of the zinc decreases significantly as the size of the quaternary ammonium compound increases. Thus, while all the compounds were employed in the same concentration, it will be obvious that significant corrosion resistance can be achieved with the relatively large molecules employed at a relatively low concentration.

While the mechanism of the corrosion resistance imparted by the compounds of the present invention is not completely understood, it is believed that the compounds employed are hydrophobic in nature which, whether in solution in the electrolyte or precoated on the metal, form a protective layer which retards the solution of the metal but still does not interfere with the electrical characteristics of the cell.

As stated above, particularly useful results can be achieved by employing quaternary ammonium compounds in combination with other conventional corrosion inhibitors. A particularly preferred combination comprises mercuric chloride and tetraalkyl ammonium chloride. The ratio of quaternary ammonium compound to conventional corrosion inhibitors may range over a relatively wide range. Effectiveness of the corrosion inhibitor has been found at 0.01% based on the weight of electrolyte. The following nonlimiting example illustrates the advantageous results achieved by the above-described combination of conventional corrosion inhibitor and corrosion inhibitor of the present invention.

EXAMPLE I

A Leclanche battery was assembled employing a zinc anode, a manganese oxide-carbon cathode and an electrolyte composed of 26% ammonium chloride, 9% zinc chloride and 65% water, by weight. The separator paper employed contained 240 mgs. of mercuric chloride. Tetraethyl ammonium chloride was added to the electrolyte at a level of 1%, by weight, based on the weight of the electrolyte.

A second battery was constructed as above as a control except that the tetraethyl ammonium chloride was not added to the electrolyte.

After 24 hours at room temperature, the battery of the present invention was found to have two times the capacity of the control battery. After 7 days at 120° F., the battery of the present invention was found to have three times the capacity of the control battery.

The novel corrosion inhibitors of the present invention have been defined primarily in terms of additives to the system, i.e., employed in addition to the electrolyte or as a coating on the anode with a different material employed as the electrolyte. It should be understood, however, that the novel corrosion inhibitors of the present invention, when employed in primary battery cells, may replace the electrolyte in whole or in part. Thus, a primary battery cell within the scope of the present invention may contain the described corrosion inhibitor at a level of 0.1 to 100% of the electrolyte material.

The novel corrosion inhibitors of the present invention may be introduced into the system in which they are employed in a variety of ways. If the corrosion inhibitor is sufficiently soluble in the electrolyte, it may be incorporated directly therein. Alternatively, one or more solvents for the corrosion inhibitors may be employed to incorporate said inhibitors in the battery system.

When the corrosion inhibitors are applied as a precoating to the anode, they are preferably dissolved in a solvent such as methanol and coated on the anode. The methanol is allowed to evaporate, leaving a residue of the corrosion inhibitor on the anode.

What is claimed is:

1. A primary battery cell comprising an ammonium chloride electrolyte, a metallic anode and a cathode wherein a quaternary ammonium halide compound is associated with said anode.
2. The product as defined in claim 1 wherein said anode is zinc and said cathode is manganese oxide.
3. The product as defined in claim 1 wherein said quaternary ammonium compound is disposed in said electrolyte.
4. The product as defined in claim 1 wherein said quaternary ammonium compound is precoated on said anode.
5. The product as defined in claim 1 wherein said quaternary ammonium compound is a compound of the formula:

$$NR_4X$$

wherein R is an alkyl or aromatic group and X is an halogen atom.

6. The product as defined in claim 1 which includes mercuric chloride.
7. The product as defined in claim 1 wherein said compound is tetramethyl ammonium chloride.
8. The product as defined in claim 1 wherein said compound is tetraethyl ammonium chloride.
9. The product as defined in claim 1 wherein said compound is tetrapropyl ammonium chloride.
10. The product as defined in claim 1 wherein said compound is tetraheptyl ammonium chloride.
11. A galvanic cell comprising an ammonium chloride electrolyte, a metallic anode and a cathode wherein a quaternary ammonium halide compound is associated with said anode.

* * * * *